(12) United States Patent
Broz et al.

(10) Patent No.: US 11,553,823 B2
(45) Date of Patent: Jan. 17, 2023

(54) LEVERAGING SPATIAL SCANNING DATA OF AUTONOMOUS ROBOTIC DEVICES

(71) Applicant: International Business Machines Corporation, Armonk, NY (US)

(72) Inventors: Michal Broz, Cedar Park, TX (US);
Steven D. Clay, Round Rock, TX (US);
Shunguo Yan, Austin, TX (US);
Gabriel Cody Terrell, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 822 days.

(21) Appl. No.: 16/530,312

(22) Filed: Aug. 2, 2019

(65) Prior Publication Data
US 2021/0030225 A1   Feb. 4, 2021

(51) Int. Cl.
| A47L 9/28 | (2006.01) |
| G06N 5/04 | (2006.01) |
| G05D 1/00 | (2006.01) |
| H04L 12/28 | (2006.01) |
| H04W 4/38 | (2018.01) |

(Continued)

(52) U.S. Cl.
CPC .......... *A47L 9/2805* (2013.01); *G05D 1/0088* (2013.01); *G06N 5/04* (2013.01); *G06N 20/00* (2019.01); *H04L 12/282* (2013.01); *H04L 67/306* (2013.01); *H04W 4/38* (2018.02);
(Continued)

(58) Field of Classification Search
CPC ............... A47L 9/2805; A47L 2201/00; A47L 9/2857; A47L 9/2894; A47L 9/2826; A47L 2201/04; A47L 2201/06; G05D 1/0088; G05D 2201/0207; G05D 2201/0215; G06N 5/04; G06N 20/00; H04L 12/282; H04L 67/306; H04L 12/2823; H04L 2012/285; H04W 4/38
See application file for complete search history.

(56) References Cited

U.S. PATENT DOCUMENTS

| 5,141,309 A | 8/1992 | Worwag |
| 5,722,109 A | 3/1998 | Delmas et al. |

(Continued)

FOREIGN PATENT DOCUMENTS

CN  101259615 B  9/2012

OTHER PUBLICATIONS

List of IBM Patents or Patent Applications Treated as Related, Nov. 7, 2019, 2 pgs.

(Continued)

*Primary Examiner* — Michael Won
(74) *Attorney, Agent, or Firm* — Peter K. Suchecki

(57) ABSTRACT

Provided is a method, computer program product, and system for leveraging spatial scanning data of an environment collected by a robotic vacuum to generate recommendations for improving environmental conditions. A robotic vacuum may collect cleanliness data relative to an environment. The robotic vacuum may store the cleanliness data over a plurality of cleaning cycles. The robotic vacuum may analyze the cleanliness data over the plurality of cleaning cycles to identify one or more cleanliness trends. The robotic vacuum may generate a recommendation for improving an environmental condition relative to the environment based on the identified one or more cleanliness trends. The robotic vacuum may provide the recommendation to a user.

5 Claims, 6 Drawing Sheets

(51) Int. Cl.
  *G06N 20/00* (2019.01)
  *H04L 67/306* (2022.01)
(52) U.S. Cl.
  CPC .. *A47L 2201/00* (2013.01); *G05D 2201/0207* (2013.01); *G05D 2201/0215* (2013.01)

(56) References Cited

U.S. PATENT DOCUMENTS

| | | | |
|---|---|---|---|
| 6,956,348 | B2 | 10/2005 | Landry et al. |
| 7,774,158 | B2 | 8/2010 | Domingues Goncalves et al. |
| 10,022,614 | B1* | 7/2018 | Tran ................... G01L 5/0052 |
| 10,025,887 | B1 | 7/2018 | Santarone et al. |
| 10,467,677 | B2* | 11/2019 | Wilson ............... G06Q 30/0269 |
| 10,518,409 | B2* | 12/2019 | Oleynik ............... B25J 15/0095 |
| 11,010,233 | B1* | 5/2021 | Golden ................. G06F 21/554 |
| 11,274,929 | B1* | 3/2022 | Afrouzi .................. G01C 21/30 |
| 11,348,269 | B1* | 5/2022 | Ebrahimi Afrouzi ....... G01S 7/4804 |
| 11,382,473 | B2 | 7/2022 | Burns et al. |
| 2003/0207655 | A1* | 11/2003 | Jackson ................... B08B 6/00 451/38 |
| 2006/0184293 | A1 | 8/2006 | Konandreas et al. |
| 2009/0006061 | A1* | 1/2009 | Thukral ................. G16H 50/20 703/11 |
| 2011/0004342 | A1 | 1/2011 | Knopow et al. |
| 2011/0251988 | A1* | 10/2011 | Pronk ................ H04N 21/4668 706/46 |
| 2012/0078417 | A1 | 3/2012 | Connell, II et al. |
| 2012/0118163 | A1 | 5/2012 | Gorga |
| 2013/0004270 | A1* | 1/2013 | Rebstock .......... H01L 21/67769 901/30 |
| 2013/0268394 | A1* | 10/2013 | Nikankin ........... G06Q 30/0631 705/26.7 |
| 2013/0304301 | A1 | 11/2013 | Rakshit |
| 2014/0007371 | A1 | 1/2014 | Lu et al. |
| 2014/0052680 | A1* | 2/2014 | Nitz ......................... G06N 5/04 706/46 |
| 2014/0207282 | A1 | 7/2014 | Angle et al. |
| 2014/0266669 | A1 | 9/2014 | Fadell et al. |
| 2014/0280193 | A1* | 9/2014 | Cronin ................... G06N 20/00 707/741 |
| 2015/0185716 | A1* | 7/2015 | Wichmann ................ F02C 9/28 700/287 |
| 2016/0051185 | A1* | 2/2016 | Wisbey .............. A61B 5/02416 600/595 |
| 2016/0066894 | A1* | 3/2016 | Barton-Sweeney ........ A61B 5/0836 600/301 |
| 2016/0290912 | A1 | 10/2016 | Kent et al. |
| 2017/0053068 | A1* | 2/2017 | Pillai ...................... G16H 10/60 |
| 2017/0212523 | A1 | 7/2017 | Witelson |
| 2018/0140155 | A1 | 5/2018 | Mitchell et al. |
| 2018/0154350 | A1 | 6/2018 | Gilboa-Geffen et al. |
| 2018/0178781 | A1 | 6/2018 | Funk et al. |
| 2018/0181091 | A1 | 6/2018 | Funk et al. |
| 2018/0284786 | A1 | 10/2018 | Moshkina-Martinson et al. |
| 2018/0296050 | A1 | 10/2018 | Karakaya |
| 2019/0029486 | A1 | 1/2019 | Suvarna et al. |
| 2019/0045992 | A1 | 2/2019 | Brede et al. |
| 2019/0086286 | A1 | 3/2019 | Mikkelsen |
| 2019/0239709 | A1 | 8/2019 | Thomas |
| 2019/0293539 | A1 | 9/2019 | Manautou et al. |
| 2020/0069134 | A1 | 3/2020 | Ebrahimi Afrouzi et al. |
| 2020/0217057 | A1 | 7/2020 | Spiro et al. |
| 2020/0256578 | A1 | 8/2020 | Meis et al. |
| 2021/0030241 | A1 | 2/2021 | Kim |
| 2021/0107040 | A1 | 4/2021 | Violetta |

OTHER PUBLICATIONS

Broz et al., "Leveraging Spatial Scanning Data of Autonomous Robotic Devices," U.S. Appl. No. 16/680,098, filed Nov. 11, 2019.
Anonymous, "Method and System for Providing Robotic Valets for Organizing Living Spaces Based on User Familiarity, Comfort and Recognition," an IP.com Prior Art Database Technical Disclosure, IP.com No. IPCOM000256332D, Nov. 19, 2018, 4 pgs.
Mell et al., "The NIST Definition of Cloud Computing," Recommendations of the National Institute of Standards and Technology, U.S. Department of Commerce, Special Publication 800-145, Sep. 2011, 7 pgs.

\* cited by examiner

US 11,553,823 B2

LEVERAGING SPATIAL SCANNING DATA OF AUTONOMOUS ROBOTIC DEVICES

BACKGROUND

The present disclosure relates generally to the field of autonomous robotic devices, and more specifically, to leveraging spatial scanning data of an environment collected by a robotic device to generate recommendations for improving environmental conditions.

Autonomous robotic devices, such as robotic vacuums, routinely scan environments as part of regular cleaning cycles. The data collected may be used to improve various cleaning patterns of the robotic vacuum.

SUMMARY

Embodiments of the present disclosure include a method, computer program product, and robotic vacuuming system for leveraging spatial scanning data of a robotic vacuum. The robotic vacuum may analyze the cleanliness data over the plurality of cleaning cycles to identify one or more cleanliness trends. The robotic vacuum may generate a recommendation for improving an environmental condition relative to the environment based on the identified one or more cleanliness trends. The robotic vacuum may provide the recommendation to a user.

Embodiments of the present disclosure include a method, computer program product, and robotic vacuuming system for leveraging spatial scanning data of an environment collected by a robotic vacuum to generate recommendations for improving environmental conditions. A robotic vacuum may collect cleanliness data relative to an environment. The robotic vacuum may store the cleanliness data over a plurality of cleaning cycles. The robotic vacuum may analyze the cleanliness data over the plurality of cleaning cycles to identify one or more cleanliness trends. The robotic vacuum may generate a recommendation for improving an environmental condition relative to the environment based on the identified one or more cleanliness trends. The robotic vacuum may provide the recommendation to a user.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
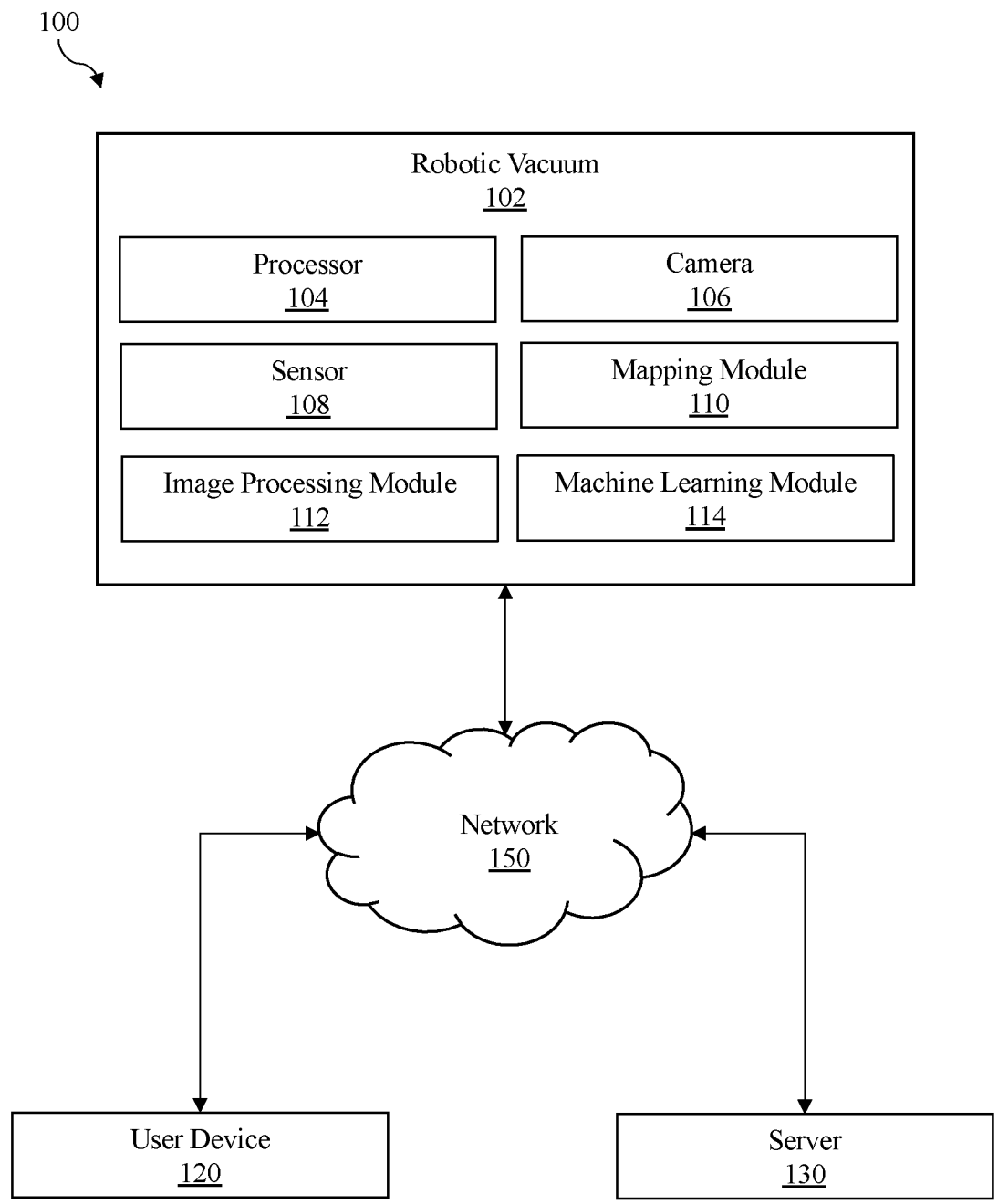
FIG. 1 illustrates a block diagram of a robotic vacuuming system, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate to the field of autonomous robotic devices, and more particularly to leveraging spatial scanning data of an environment collected by a robotic vacuum to generate recommendations for improving environmental conditions. While the present disclosure is not necessarily limited to such applications, various aspects of the disclosure may be appreciated through a discussion of various examples using this context.

Autonomous robotic devices, such as robotic vacuums, routinely scan environments as part of regular cleaning cycles. The data collected during each cleaning cycle may include the spatial layout of the environment, amount of dirt and/or debris within specific areas of the environment, and the type of dirt and/or debris found within the environment. For example, robotic vacuums may determine the layout of furniture within a household and where various landmarks (e.g., air ducts, windows, kitchen sinks, etc.) are located. During a cleaning cycle, the robotic vacuum may determine how much dirt and debris is picked up at various locations throughout the house by utilizing various debris sensors. This information may be analyzed to improve cleaning patterns of the robotic vacuum. Further, robotic vacuums may determine various types of dirt and/or debris located throughout the home (e.g., dust, pollen, grease, pet hair, liquid, gas, mold, etc.) via image recognition and/or various sensors disposed on the robotic vacuum. The reoccurring scanning data may be used to improve the performance of the robotic vacuum.

Embodiments of the present disclosure utilize reoccurring spatial scanning data collected by an autonomous robotic vacuum during routine cleaning cycles to generate recommendations for a user to aid in improving environmental conditions relative to an environment. In embodiments, a robotic vacuum may collect cleanliness data (e.g., spatial scanning data) relative to an environment. For example, the robotic vacuum may collect cleanliness data relative to the location, type, and amount of dirt and/or debris found within the environment. The environment may be any type of environment (e.g., household, commercial property, hospital, nursing home, etc.). The robotic vacuum may store the cleanliness data over a plurality of cleaning cycles. For example, robotic vacuums typically run on a routine maintenance schedule. Each time the robotic vacuum performs a cleaning cycle, the environment is scanned, and the data generated from each cleaning cycle is stored over multiple runs.

Once the cleanliness data is collected, the robotic vacuum may analyze the cleanliness data over the plurality of cleaning cycles to identify one or more cleanliness trends. For example, as the robotic vacuum performs each cleaning cycle, the cleanliness of the area may change over time (e.g., detecting a buildup of dirt around one or more air ducts over time). The cleanliness trends may be used to identify historical trends and/or characteristics of dirt/debris detected in various locations within the environment. In embodiments, the robotic vacuum may utilize various cleanliness thresholds (e.g., sensitivity levels) to determine when a specific area is dirty. The thresholds may be set by default, manually by a user according to the user's preference for cleanliness within the environment, or via machine learning.

Once a cleanliness trend is detected indicating an area in the environment is dirty and/or needs to be addressed by the user, the robotic vacuum may generate a recommendation for improving an environmental condition of the environment. In embodiments, the recommendation may be correlated to a user profile that includes the preferences of the user. For example, the user profile may include an option to notify a user having a pollen allergy when a predetermined amount of pollen is detected by the robotic vacuum. Once the recommendation is generated, the robotic vacuum may provide the recommendation to a user.

In embodiments, the recommendation may be any type of recommendation related to addressing the environmental condition (e.g., cleanliness condition of an area, physical condition of an object such as furniture or an air filter, etc.) of the environment. For example, the robotic vacuum may recommend changing an air filter within a heating, ventilation, and air conditioning (HVAC) system when detecting excessive dirt near multiple air ducts within a home. In another example, the system may recommend inspecting an area for mold when cleanliness trends indicate an area, such as flooring, has been determined to be wet for multiple days over multiple cleaning cycles. In another example, the robotic vacuum may detect a wear pattern in a textile floor covering (e.g., carpet, rug, etc.) and recommend to the user to reposition the furniture and/or the textile floor covering in an alternative layout to minimize wear on the covering.

In embodiments, the recommendation may be sent to a user device (e.g., smartphone, tablet, computer, smartwatch, etc.) or may be displayed on a user interface on the robotic vacuum. In embodiments, the recommendation may be in the form of a text message, audio message, image, and/or video recording. For example, the robotic vacuum may detect a buildup of dust around an air vent and send a text message to the user accompanied by an image of the air duct. In this way, the robotic vacuum may notify the user in multiple ways to aid the user in improving cleanliness of the environment.

In embodiments, the robotic vacuum may utilize machine learning to improve recommendations for the user. For example, the robotic vacuum may analyze the cleanliness of a specific area after making a recommendation to a user. The robotic vacuum may determine over one or more cycles if the user has complied with the recommendation and, if not, adjust sensitivity levels for making specific recommendations. For example, if the robotic vacuum recommends changing the furniture layout of a room because of carpet wear, but the user has not complied with the recommendation, the robotic device may determine the sensitivity level for detecting carpet wear is set too high and may adjust the level. In this way, the user will not be continually notified when carpet wear is detected by the robotic vacuum.

The aforementioned advantages are example advantages, and not all advantages are discussed. Furthermore, embodiments of the present disclosure can exist that contain all, some, or none of the aforementioned advantages while remaining within the spirit and scope of the present disclosure.

With reference now to FIG. 1, shown is a block diagram of a robotic vacuuming system 100, in accordance with embodiments of the present disclosure. In the illustrated embodiment, robotic vacuuming system 100 includes a robotic vacuum 102 that is communicatively coupled to user device 120 and server 130 via network 150. Robotic vacuum 102, user device 120, and server 130 may be any type of computer system and may be substantially similar to computer system 1101 of FIG. 4. In embodiments, user device 120 may be any type of user device (e.g., smartphone, tablet, computer, smartwatch, etc.) configured to receive notifications from robotic vacuum 102.

The network 150 may be any type of communication network, such as a wireless network or a cloud computing network. The network 150 may be substantially similar to, or the same as, cloud computing environment 50 described in FIG. 5 and FIG. 6. In some embodiments, the network 150 can be implemented using any number of any suitable communications media. For example, the network may be a wide area network (WAN), a local area network (LAN), an internet, or an intranet. In certain embodiments, the various systems may be local to each other, and communicate via any appropriate local communication medium.

For example, robotic vacuum 102 may communicate with user device 120 and/or server 130 using a WAN, one or more hardwire connections (e.g., an Ethernet cable) and/or wireless communication networks (e.g., wireless router). In some embodiments, the various systems may be communicatively coupled using a combination of one or more networks and/or one or more local connections. For example, robotic vacuum 102 may communicate with server 130 using a hardwired connection via a docking station (not shown), while communication between the robotic vacuum 102 and user device 120 may be through a wireless communication network.

In the illustrated embodiment, robotic vacuum 102 includes processor 104, camera 106, sensor 108, mapping module 110, image processing module 112, and machine learning module 114. In embodiments, camera 106 is communicatively coupled to the robotic vacuum 102 and configured to capture image data of the environment during each cleaning cycle. For example, camera 106 may capture image data showing various types of dirt or debris located on the floor within an environment. In other embodiments, camera 106 may be an Internet of Things (IoT) camera positioned at a location within the environment that can send image data to robotic vacuum 102. In embodiments, image processing module 112 is configured to analyze the image data generated from camera 106 to determine what type of dirt or debris is present in the environment. For example, image processing module 112 may identify through image analysis (e.g., pattern recognition, feature extraction, classification, etc.) that an area on the floor contains mold, liquid, dust, or pollen.

In embodiments, sensor 108 may be one or more sensors (e.g., liquid sensor, moisture, sensor, gas sensor, air quality sensor, debris sensor, etc.) configured to identify the environmental condition relative to the environment. For example, sensor 108 may be a liquid sensor disposed on the robotic vacuum configured to determine if one or more substances (e.g., water) are present in an area within the environment. In other embodiments, sensor 108 may be a debris sensor configured to determine an amount of debris located at area within the environment. For example, the debris sensor may be an optical sensor using a light emitter and detector to determine the amount of debris passing through the robotic vacuum during the cleaning cycle. In this way, the robotic vacuum may utilize the sensors to identify various amounts of dirt or debris located at specific areas throughout the environment and make recommendations to the user to improve the cleanliness of the environment.

In embodiments, sensor 108 may be configured as a proximity sensor that aids the robotic vacuum 102 in avoiding certain substances when detected (e.g., sticky substances). This prevents the robotic vacuum 102 from traveling over and/or vacuuming up the substance. When a substance to be avoided is detected, the system may identify the substance and recommend to the user to clean the identified area.

In embodiments, mapping module 110 is configured to generate a virtual map of the environment during each cleaning cycle. The mapping module 110 may identify the location of detected dirt and/or debris (e.g., determined by image analysis and/or sensors) relative to various rooms and/or landmarks within the environment during a cleaning cycle. Over time, the virtual map of the environment may change based on the cleanliness data collected during each cleaning cycle. For example, an area (e.g., room where a pet sleeps) may be identified as having excessive pet hair or a buildup of pet hair over time based on trends in the cleanliness data. The robotic vacuum 102 may use this data trend to make a recommendation to have the pet groomed or in some circumstances schedule a veterinarian appointment depending on the amount of pet hair detected.

In embodiments, when dirt/debris is detected within an area in the environment, the robotic vacuum 102 may send the recommendation to user device 120 prompting the user to take action. The recommendation may be in any form (e.g., text message, video, audio). For example, the robotic vacuum 102 may send an image of a wet spot on the floor along with the recommendation to inspect the area for water leaks. In embodiments, the recommendation may be received in a software application installed on user device 120. In embodiments, the user may set operation settings of the robotic vacuum 102 using the software application. In other embodiments, the robotic vacuum 102 may be controlled via settings accessible on a user interface disposed on the robotic vacuum. In embodiments, the robotic vacuum 102 may include a user interface that displays the recommendation to the user. In embodiments, the robotic vacuum 102 may store user profile information for one or more users.

In embodiments, the user profile information may be stored on robotic vacuum 102, user device 120, and/or server 130. The user profile may include various preferences for generating recommendations relative to the cleanliness data/trends. For example, the user profile may include default or manually adjusted thresholds and/or sensitivity levels for notifying the user of a cleanliness trend. For example, a first user may prefer to be notified when pollen is detected in an area within the environment because the first user may have a pollen allergy, while a second user may not want to be notified since the second user does not have a similar allergy. In this way, the recommendation settings may be unique for each user. In embodiments, the robotic vacuum 102 may determine which user to notify based on image recognition of the specific user (e.g., when using the user interface on the robotic vacuum to display the recommendation) or by sending the recommendation to a specific user device associated with the user.

In embodiments, machine learning module 114 may comprise various machine learning engines (artificial neural network, correlation engines, reinforcement feedback learning model, supervised/unsupervised learning model, etc.) configured to analyze scanning/cleanliness data generated from the robotic vacuuming system 100 to improve predictions for sending recommendations to the user. For example, the machine learning module 114 may utilize a feedback learning model to collect user preferences and user actions in response to receiving recommendations to reinforce the supervised and/or unsupervised models. Over time, the robotic vacuum 102 can become more accurate in properly adjusting the sensitivity for generating recommendations according to the user's preferences. For example, the robotic vacuum may detect moisture coming from a window in the user's home and recommend that the user inspect the window for leaks. Based on reoccurring scanning data subsequent to sending the recommendation, the robotic device may continue to detect the moisture. Over time the machine learning module 114 may determine the user has not taken any action to rectify the leak and therefore may lower the sensitivity for generating the recommendation relative to the detected moisture data. In this way, the machine learning module may learn from the user's actions (or inaction) to determine preferences for receiving recommendations.

In embodiments, the machine learning module 114 may determine, by analyzing the current cleanliness data, that the user has performed an action that has improved the environmental condition of the environment. For example, the cleanliness data may indicate dirt is no longer being detected near the air ducts in the home, which may indicate the user has replaced the air filter in the HVAC system. Once the machine learning module 114 determines the user has taken a corrective action to address an environmental condition, the robotic vacuum may disregard cleanliness data (e.g., relative to the dirty air ducts) that was collected prior to the user performing the corrective action from consideration for determine subsequent cleanliness trends. In this way, the robotic vacuum will start fresh with new cleanliness data for determining trends once a user action is performed that addresses the environmental condition (e.g., mopping up a water leak, cleaning mold, cleaning air ducts, etc.)

In embodiments, machine learning module 114 may be configured to learn from other robotic vacuums that may be communicatively coupled to server 130. For example, machine learning module 114 may analyze data from other robotic vacuums to determine proper sensitivity settings based on one or more other users (e.g., crowdsourcing). For example, machine learning module 114 may receive data from other robotic vacuums indicating one or more environmental conditions are occurring in one or more environments within a specific region. Based on the data received the robotic vacuum 102 may send a recommendation relative to rectifying the environmental condition. For example, multiple robotic vacuums may detect a gas leak occurring in multiple homes within a neighborhood. Machine learning module 114 may analyze this information and correlate the location of robotic vacuum 102 to determine if the robotic vacuum is in the affected region. If determined to be in the affected region, robotic vacuum 102 may recommend to the user to check for the gas leak and/or to avoid occupying the home.

FIG. 1 is intended to depict the representative major components of the robotic vacuuming system 100. In some embodiments, however, individual components may have greater or lesser complexity than as represented in FIG. 1, components other than or in addition to those shown in FIG. 1 may be present, and the number, type, and configuration of such components may vary. Likewise, one or more components shown with the robotic vacuuming system 100 may not be present, and the arrangement of components may vary.

For example, while FIG. 1 illustrates an example robotic vacuuming system 100 having a single robotic vacuum 102, a single user device 120, and a single server 130, suitable network architectures for implementing embodiments of this disclosure may include any number of robotic vacuums, user devices, and servers. The various models, modules, systems, and components illustrated in FIG. 1 may exist, if at all, across a plurality of robotic vacuums, user devices, base stations, and servers.

Figure 2:
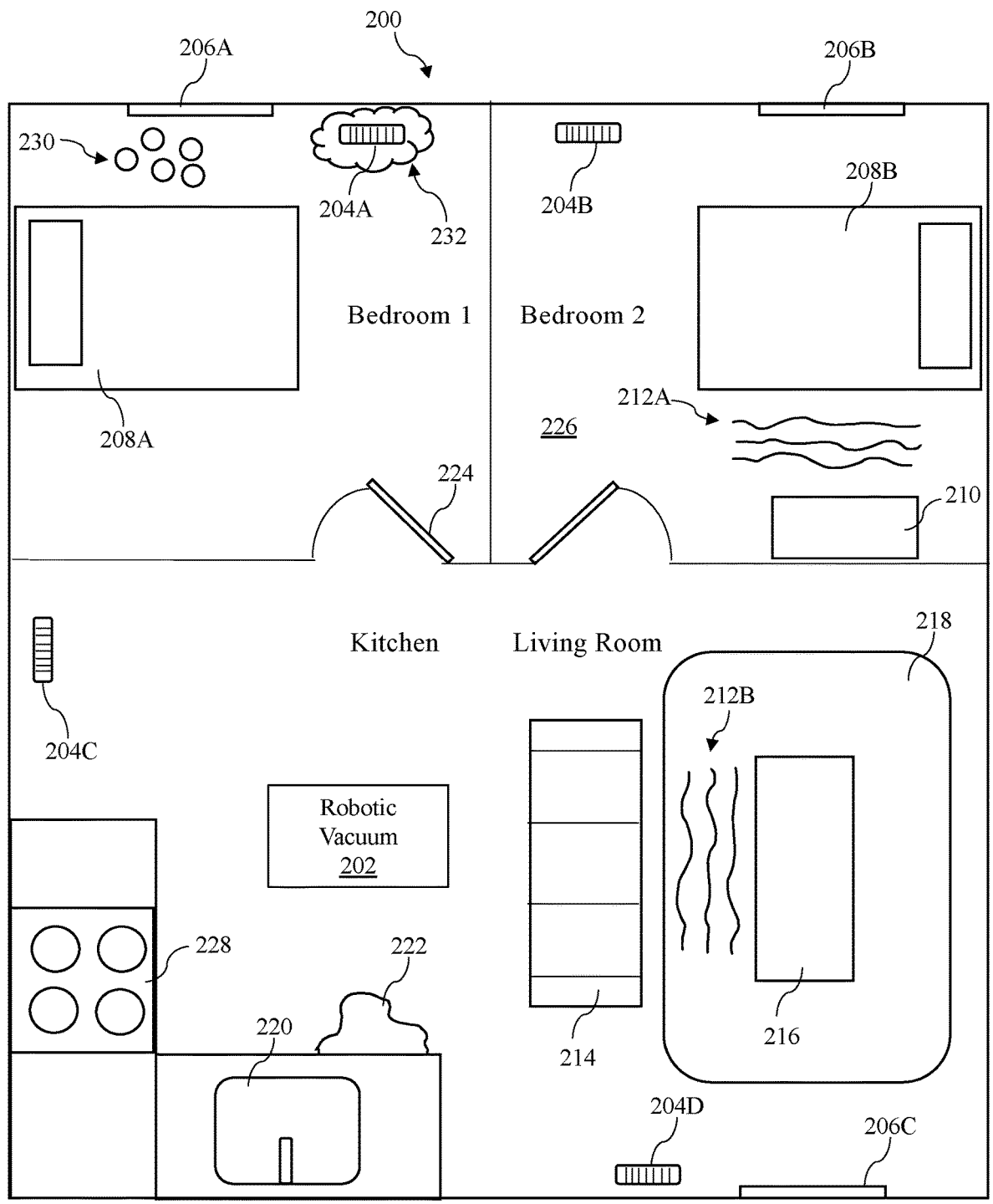
FIG. 2 illustrates an example diagram of an environment scanned by a robotic vacuum, in accordance with embodiments of the present disclosure.

Referring now to FIG. 2, shown is an example diagram of an environment 200 scanned by a robotic vacuum 202, in accordance with embodiments of the present disclosure. In the illustrated embodiment, the environment 200 is representative of a household including a kitchen, living room, bedroom 1, and bedroom 2. However, in other embodiments, the environment may be any type of space (e.g., warehouse, hospital, school, etc.). Robotic vacuum 202 is configured to scan all areas of the environment during one or more cleaning cycles and collect cleanliness data relative to the environment. During scanning, the robotic vacuum 202 may identify various landmarks throughout the environment and construct a virtual map of the layout. For example, the robotic vacuum 202 may identify air duct 204A, 204B, 204C, and 204D (collectively referred to as air ducts 204); window 206A, 206B, and 206C (collectively referred to as window 206); bed 208A and 208B (collectively referred to as bed 208); dresser 210, couch 214, table 216, rug 218, sink 220, door 224, carpet 226, and oven 228.

In embodiments, the robotic vacuum 202 may identify various cleanliness trends by analyzing the spatial scanning data (e.g., cleanliness data) generated during each cleaning cycle. For example, the robotic vacuum 202 may determine that one or more air ducts 204 within the environment 200 contain an excessive amount of dirt.

In the illustrated embodiment, air duct 204A located in bedroom 1 contains an excessive amount of dirt 232 located around the perimeter of the duct. Based on the cleanliness data/trend, the robotic vacuum 202 may determine that the dirt 232 around the air duct 204A has exceeded a predetermined amount (e.g., measured through debris sensor or visually over time). The robotic vacuum 202 may generate a recommendation for a user to inspect air duct 204A for a leak (e.g., dirt coming from an external source infiltrating the air duct) since it is the only air duct determined to contain dirt 232. In other embodiments, if the robotic vacuum 202 determines all air ducts 204 contain an excessive amount of dirt, the robotic vacuum may generate a recommendation prompting the user to change an air filter within the household's heating, ventilation, and air conditioning (HVAC) system.

In embodiments, the robotic vacuum 202 may identify one or more allergens 230 (e.g., pollen, dust, etc.) within the environment 200. In the illustrated embodiment, the robotic vacuum may identify allergen 230 located between window 206A and bed 208A. Once the allergen 230 is identified, the robotic device may send a recommendation to the user to inspect and/or replace any seals around the window 206A to prevent the allergen from coming into the bedroom. In another example, a user that is allergic to allergen 230 may receive a recommendation to avoid bedroom 1 until the allergen has been removed (e.g., the robotic vacuum no longer detects the allergen after the window has been fixed).

In embodiments, the robotic vacuum may identify a wear pattern 212A within carpet 226 based on visual matting of the carpet and/or an increased amount of dirt and debris vacuumed up from the carpet over time. Once the wear pattern 212A is identified, the robotic vacuum 202 may recommend to the user to rearrange the furniture within the room to prevent further wear on the carpet 226. For example, the robotic vacuum may recommend switching bed 208B with dresser 210 based on correlating the virtual mapping of the room with the location of the wear pattern 212A. In another embodiment, the robotic vacuum may detect wear pattern 212B in rug 218 located in the living room. Through visual recognition the robotic vacuum 202 may identify the rug 218 as a textile floor covering that may be repositioned and make a recommendation to rotate the rug 218 relative to couch 214 and table 216 rather than moving any furniture. In this way, the robotic vacuum 202 may make recommendations for preventing wear based on the type of textile floor covering and furniture layout within the room.

In another embodiment, the robotic vacuum 202 may identify one or more substances within the environment that may be indicative of a leak. For example, the robotic vacuum 202 may detect water 222 located near sink 220. In response to detecting the water 222, the robotic vacuum 202 may recommend to the user to inspect for both a water leak and/or mold or mildew within the area depending on the length of time the water 222 has been present. In another example, the robotic vacuum may detect a gas leak coming from oven 228. In response to detecting the gas leak, the robotic vacuum may send a recommendation to the user to immediately leave the premises and to notify emergency personal.

Figure 3:
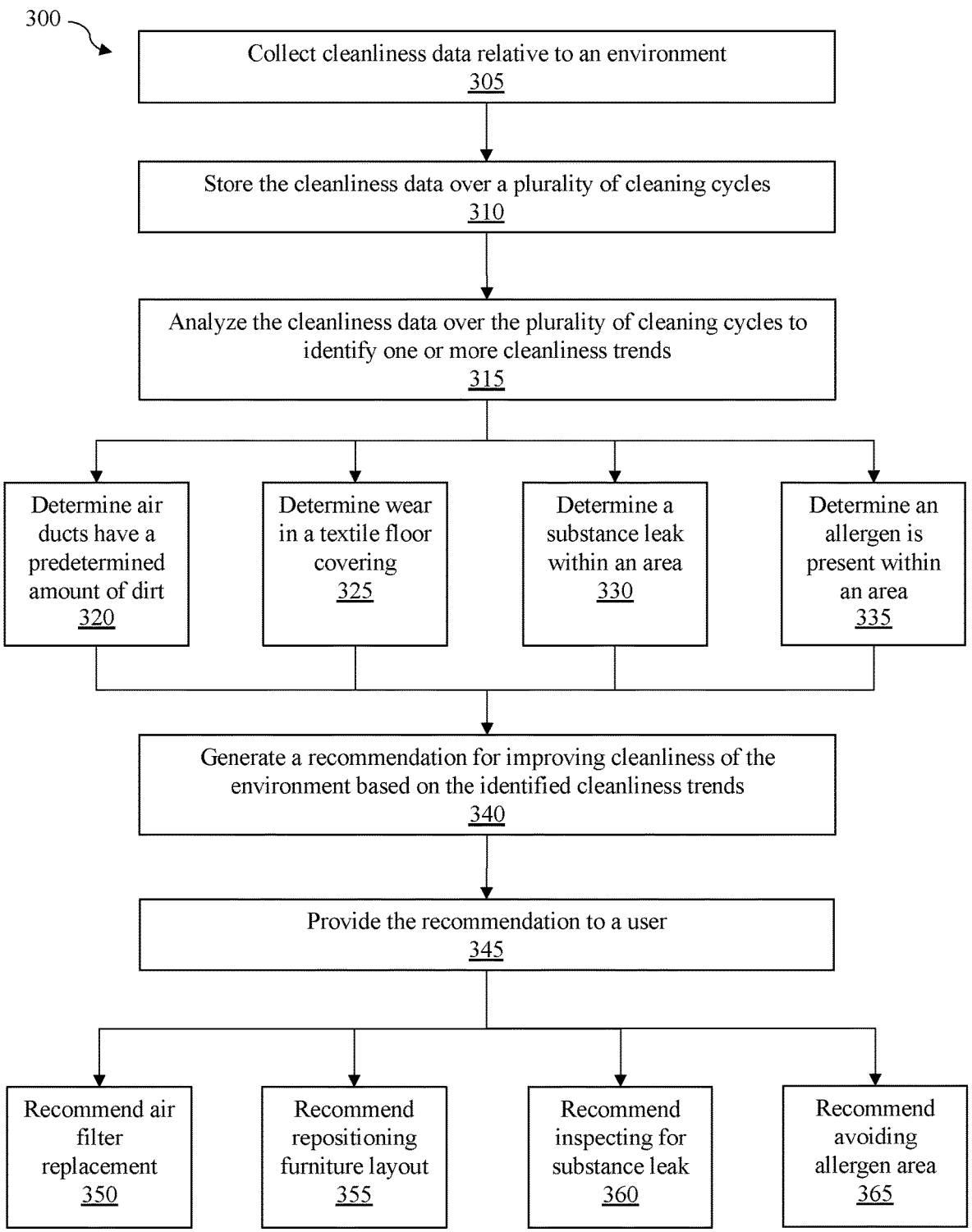
FIG. 3 illustrates a flow diagram of an example process for leveraging spatial scanning data collected by a robotic vacuum to generate recommendations for improving environmental conditions, in accordance with embodiments of the present disclosure.

Referring now to FIG. 3, shown is a flow diagram of an example process 300 for leveraging spatial scanning data collected by a robotic vacuum to generate recommendations for improving environmental conditions, in accordance with embodiments of the present disclosure. The process 300 may be performed by processing logic that comprises hardware (e.g., circuitry, dedicated logic, programmable logic, microcode, etc.), software (e.g., instructions run on a processor to perform hardware simulation), firmware, or a combination thereof. In some embodiments, the process 300 is a computer-implemented process. The process 300 may be performed by processor 104 exemplified in FIG. 1.

The process 300 begins by collecting cleanliness data (e.g., spatial scanning data) relative to an environment. This is illustrated at step 305. The cleanliness data may be collected as part of the reoccurring cleaning cycle of the robotic vacuum. During each cleaning cycle, the robotic vacuum may collect various cleanliness data (e.g., via various sensors, cameras, etc.) regarding the type, amount, and location of various dirt, debris, and the like. Once collected, the process 300 continues by storing the cleanliness data over a plurality of cleaning cycles. This is illustrated at step 310.

The process 300 continues by analyzing the cleanliness data over the plurality of cleaning cycles to identify one or more cleanliness trends. This is illustrated at step 315. For example, the cleanliness data may indicate various dirt or debris has built up over time by analyzing the detected amount and/or visual indication of the dirt build up within the environment.

In embodiments, the system may determine one or more areas that need to be addressed by utilizing the cleanliness trends. For example, the process 300 may continue by determining based on the cleanliness data/trend that there is a buildup of dirt surrounding and/or disposed on a plurality of air ducts (e.g., through visual data and/or debris sensor data indicating dirt increasing over time to reach a predetermined amount). This is illustrated at step 320.

In another embodiment, the process 300 may continue by determining significant wear patterns within one or more textile floor coverings placed within the environment. This is illustrated at step 325. For example, the robotic vacuum may detect significant dirt and debris increase relative to walking areas on the carpet or rug indicating wear. Alternatively, the robotic vacuum may detect the wear pattern visually through image recognition to determine the carpet or rug is experiencing wear.

In another embodiment, the process 300 may continue by determining through image recognition and/or sensor data that a substance leak (e.g., liquid, gas, etc.) has be discovered within an area. This illustrated at step 330. For example, the robotic vacuum may determine that water has been detected over a three-day span in an area within the kitchen.

In another embodiment, the process 300 may continue by determining an allergen is present within an area in the environment. This is illustrated at step 335. For example, the robotic vacuum may detect an amount of allergen present in the air using one or more various sensors and/or cameras. In an embodiment, the robotic vacuum may compare the amount of allergen detected in the air to an allergen threshold to determine if the amount is significant (e.g., requiring an alert/recommendation to be sent to a user).

It is noted that multiple determinations regarding the environmental condition relative to an environment may be made using the reoccurring spatial scanning data/cleanliness data. The examples described above are not meant to be limiting.

Once the cleanliness data is analyzed, the process 300 continues by generating a recommendation for improving the cleanliness of the environment based on the identified one or more cleanliness trends. This is illustrated at step 340. In embodiments, the recommendation may be generated relative to one or more users. For example, the robotic vacuum may identify one or more users based on a user profile. The user profile may include preferences regarding environmental conditions within the scanned environment. Once the preferences are identified, the robotic vacuum may correlate the recommendation with the preferences within the user profile.

For example, a user may include a preference to notify the user when pollen is detected within their home. In another example, a user may prefer to decrease the sensitivity level of detecting carpet wear to reduce the amount of recommendations sent to the user if their carpets are old. In another example, one or more users may prefer a high sensitivity setting for detecting various dirt and debris within a specific environment (e.g., hospital). In this way, the recommendations can be generated relative to user preferences stored within a user profile. In embodiments, the user profile may be stored locally on the robotic vacuum, the user device, the base station, and/or a server such that it may be accessed from other devices.

Once the recommendation is generated, the process 300 continues by providing the recommendation to a user. This is illustrated at step 345. In embodiments, the recommendation may prompt the user to address one or more cleanliness issues identified within the environment. For example, in response to determining a plurality of air ducts contain a predetermined amount (e.g., 1 gram) of dirt (step 320), the robotic vacuum may recommend to a user that an air filter within an HVAC system be replaced. This is illustrated at step 350. Alternatively, the robotic vacuum may determine a single air duct has excessive dirt and prompt the user to inspect the air duct for a leak.

In another example, in response to determining a wear pattern on one or more textile floor covering (step 325), the robotic vacuum may recommend repositioning furniture within the environment to reduce the amount of wear on various portions of the textile floor covering (e.g., carpet/rug). This is illustrated at step 355. Alternatively, the recommendation may prompt the user to reposition the text floor covering if applicable (e.g., reposition the rug to keep the furniture in place).

In another example, in response to determining a substance leak within an area (step 330), the robotic vacuum may recommend to the user to inspect the area for the substance leak. This is illustrated at step 360. For example, the robotic vacuum may detect a water leak in a kitchen and prompt the user to inspect the sink area. In another example, the robotic vacuum may prompt the user to inspect the area for mold if the water has been detected for multiple days. In embodiments, the robotic vacuum may visually identify any mold found within the environment.

In another example, in response to determining an allergen is present within an area of the environment (step 335), the robotic vacuum may recommend to the user to avoid the area until the presence of the allergen is addressed. This is illustrated at step 365. For example, the robotic vacuum may notify a specific user (e.g., using the user profile information) that is allergic to the allergen that the allergen has been detected in an amount exceeding a predetermined value. The robotic vacuum will continue to scan the area for the allergen during each routine cycle and may notify the specific user when the presence of the allergen has fallen beneath the predetermined threshold.

In embodiments, the robotic vacuum may utilize machine leaning to learn from actions taken by the user in response to receiving the recommendation. For example, the robotic vacuum may collect current cleanliness data to determine a user action taken in response to receiving the recommendation. For example, the robotic vacuum may detect pollen in a room and notify the user to inspect the seal of a window in the respective room. During subsequent cleaning cycles after sending the recommendation, the robotic vacuum may continue to detect the pollen. The robotic vacuum may determine over time, that the user has not taken action to remedy the pollen issue an may adjust the settings and/or thresholds for generating the recommendation based on the user action appropriately. In this way, the robotic vacuum may automatically lower the sensitivity settings for recommendations regarding pollen because the user has not taken any action. This prevents the robotic vacuum from continually notifying the user about a cleanliness issue that the user may not find to be significant.

It is noted that multiple types of recommendations may be made by the robotic vacuum relative to the available cleanliness data and that the above examples of recommendations are not meant to be limiting.

Figure 4:
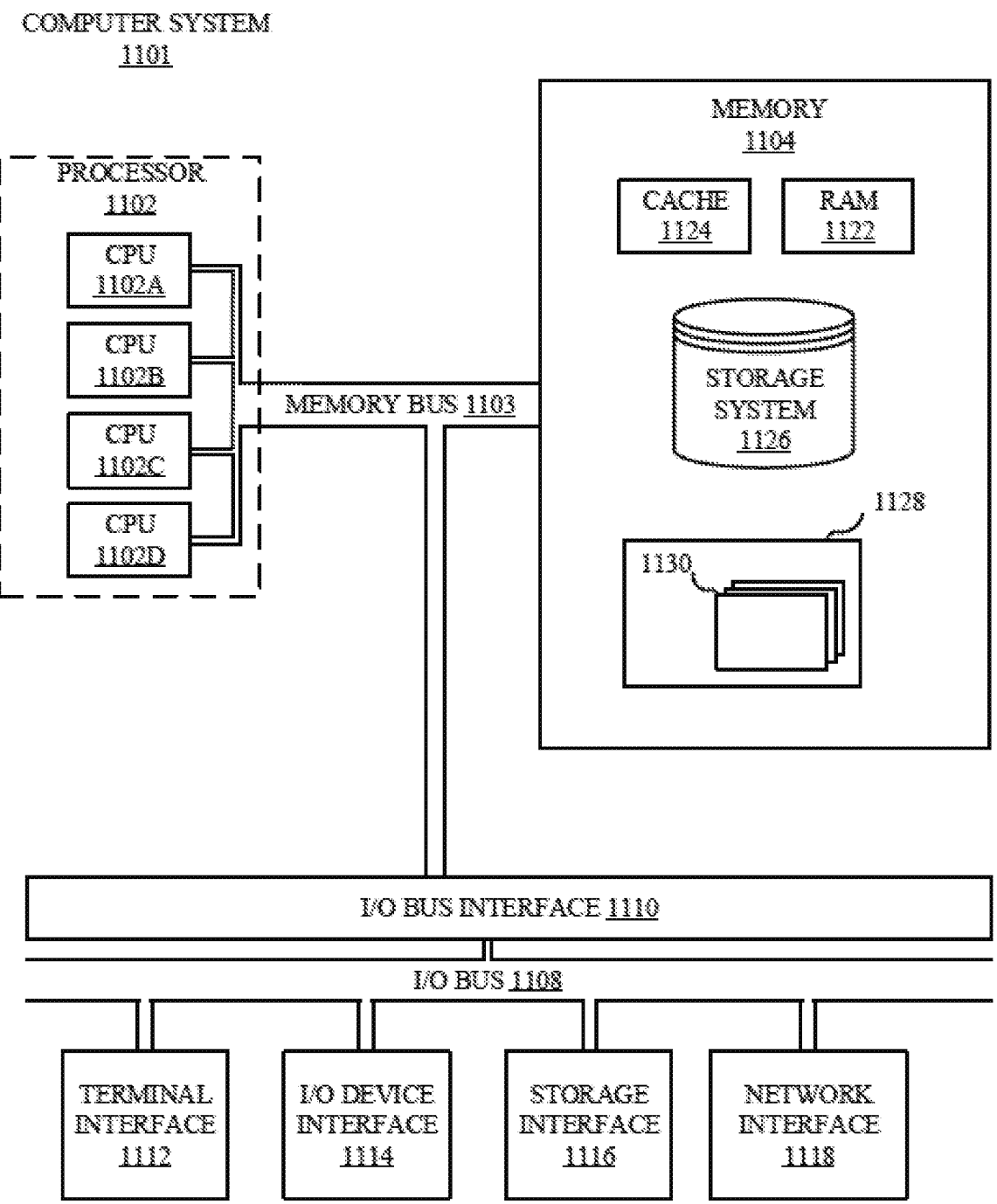
FIG. 4 illustrates a high-level block diagram of an example computer system that may be used in implementing one or more of the methods, tools, and modules, and any related functions, described herein, in accordance with embodiments of the present disclosure.

Referring now to FIG. 4, shown is a high-level block diagram of an example computer system 1101 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 1101 may comprise one or more CPUs 1102, a memory subsystem 1104, a terminal interface 1112, a storage interface 1116, an I/O (Input/Output) device interface 1114, and a network interface 1118, all of which may be communicatively coupled, directly or indirectly, for inter-component communication via a memory bus 1103, an I/O bus 1108, and an I/O bus interface 1110.

The computer system 1101 may contain one or more general-purpose programmable central processing units (CPUs) 1102A, 1102B, 1102C, and 1102D, herein generically referred to as the CPU 1102. In some embodiments, the computer system 1101 may contain multiple processors typical of a relatively large system; however, in other embodiments the computer system 1101 may alternatively be a single CPU system. Each CPU 1102 may execute instructions stored in the memory subsystem 1104 and may include one or more levels of on-board cache. In some embodiments, a processor can include at least one or more of, a memory controller, and/or storage controller. In some embodiments, the CPU can execute the processes included herein (e.g., process 300).

System memory subsystem 1104 may include computer system readable media in the form of volatile memory, such as random-access memory (RAM) 1122 or cache memory 1124. Computer system 1101 may further include other removable/non-removable, volatile/non-volatile computer system data storage media. By way of example only, storage system 1126 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory subsystem 1104 can include flash memory, e.g., a flash memory stick drive or a flash drive. Memory devices can be connected to memory bus 1103 by one or more data media interfaces. The memory subsystem 1104 may include at least one program product having a set (e.g., at least one) of program modules that are configured to carry out the functions of various embodiments.

Although the memory bus 1103 is shown in FIG. 4 as a single bus structure providing a direct communication path among the CPUs 1102, the memory subsystem 1104, and the I/O bus interface 1110, the memory bus 1103 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 1110 and the I/O bus 1108 are shown as single units, the computer system 1101 may, in some embodiments, contain multiple I/O bus interfaces 1110, multiple I/O buses 1108, or both. Further, while multiple I/O interface units are shown, which separate the I/O bus 1108 from various communications paths running to the various I/O devices, in other embodiments some or all of the I/O devices may be connected directly to one or more system I/O buses.

In some embodiments, the computer system 1101 may be a multi-user mainframe computer system, a single-user system, or a server computer or similar device that has little or no direct user interface, but receives requests from other computer systems (clients). Further, in some embodiments, the computer system 1101 may be implemented as a desktop computer, portable computer, laptop or notebook computer, tablet computer, pocket computer, telephone, smart phone, network switches or routers, or any other appropriate type of electronic device.

It is noted that FIG. 4 is intended to depict the representative major components of an exemplary computer system 1101. In some embodiments, however, individual components may have greater or lesser complexity than as represented in FIG. 4, components other than or in addition to those shown in FIG. 4 may be present, and the number, type, and configuration of such components may vary.

One or more programs/utilities 1128, each having at least one set of program modules 1130 may be stored in memory subsystem 1104. The programs/utilities 1128 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs/utilities 1128 and/or program modules 1130 generally perform the functions or methodologies of various embodiments.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
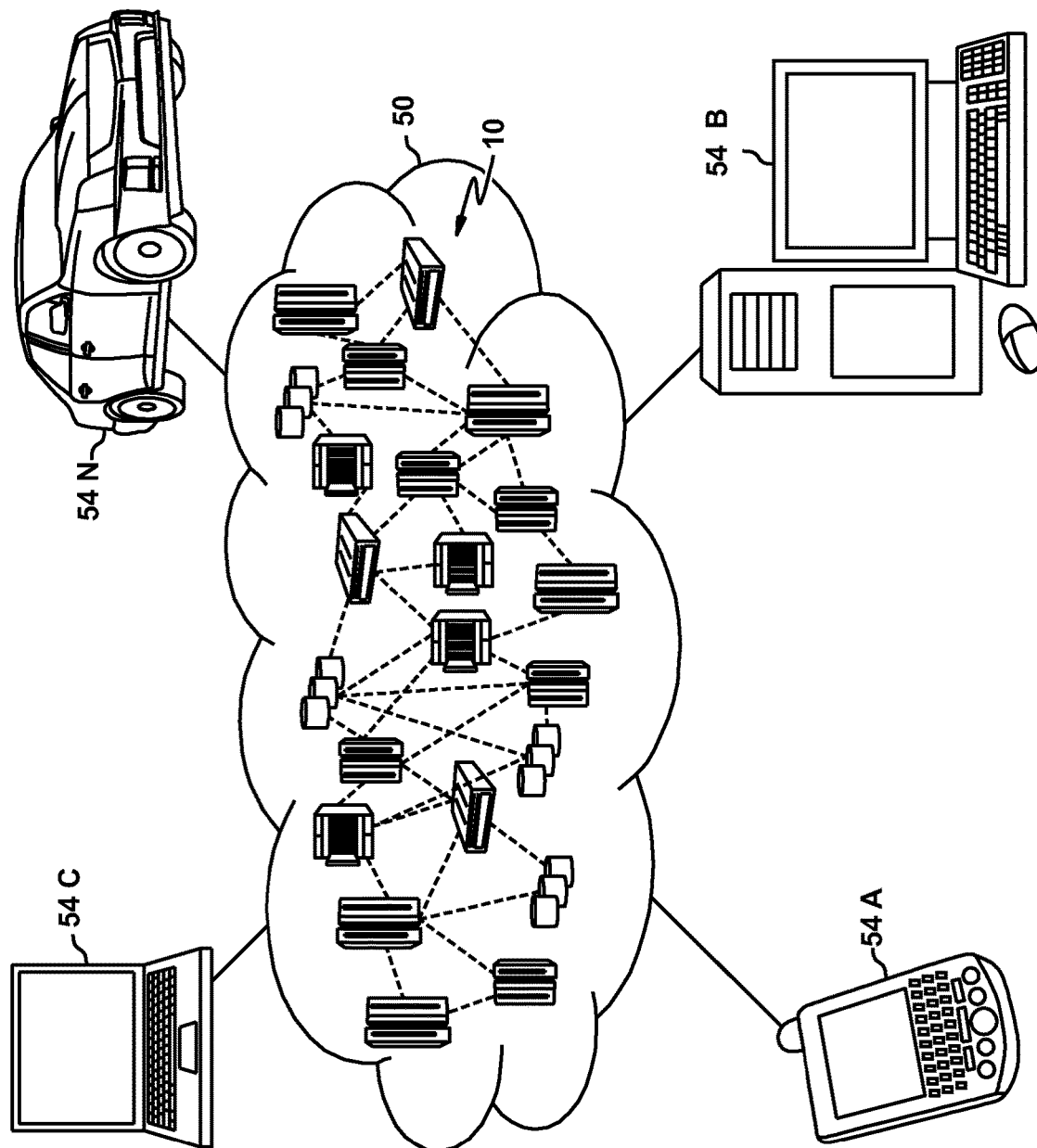
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device (e.g., robotic vacuum 102 detailed in FIG. 1) over any type of network and/or network addressable connection (e.g., using a web browser).

Figure 6:
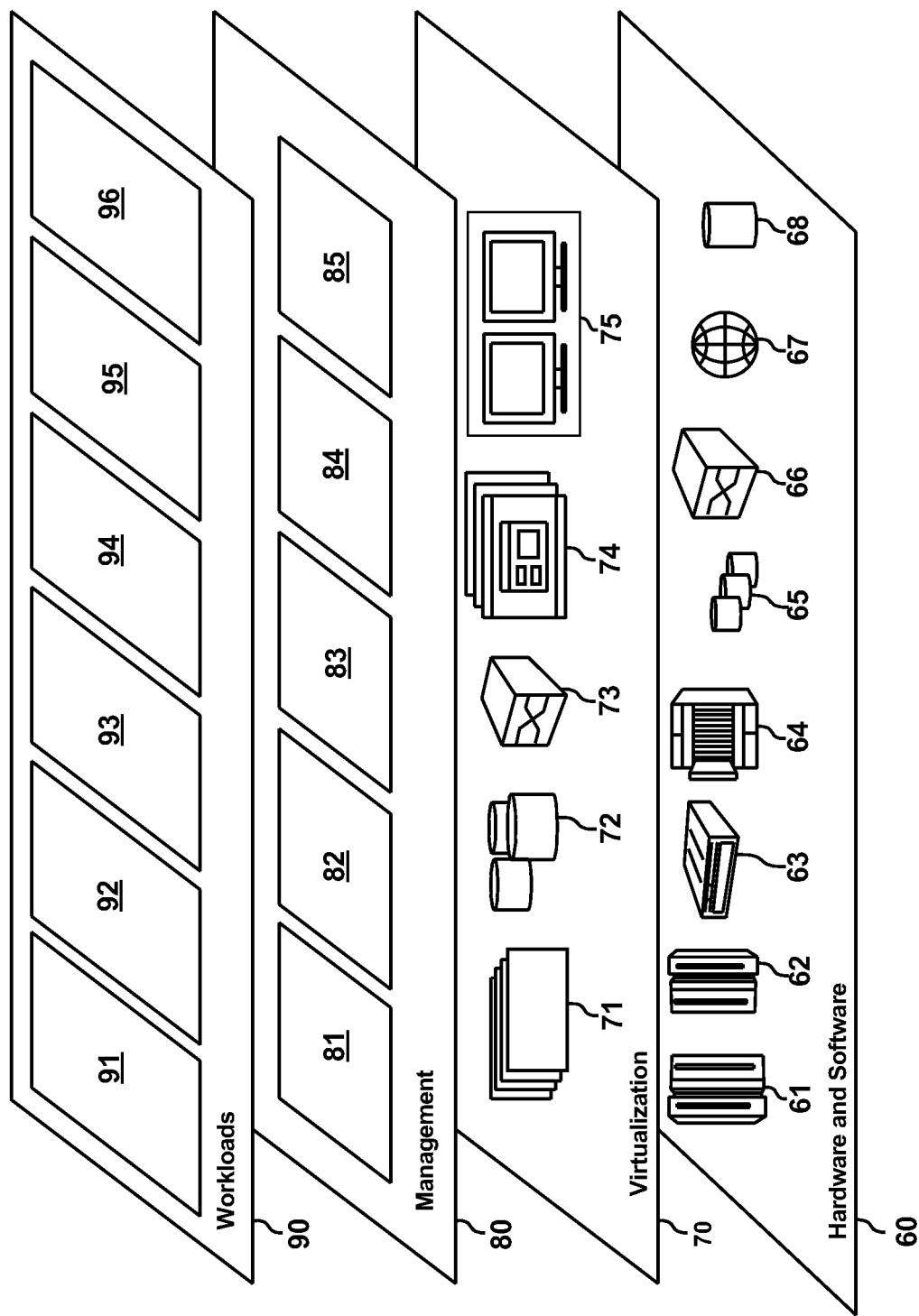
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktops 96.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:
1. A system, comprising:
a robotic vacuum;
a processor; and
a computer-readable storage medium communicatively coupled to the processor and storing program instructions which, when executed by the processor, cause the processor to perform a method comprising:

collecting, by the robotic vacuum, cleanliness data relative to an environment;

storing the cleanliness data over a plurality of cleaning cycles;

analyzing the cleanliness data over the plurality of cleaning cycles to identify one or more cleanliness trends;

generating a recommendation for improving an environmental condition relative to the environment based on the identified one or more cleanliness trends; providing the recommendation to a user;

analyzing, using machine learning, current cleanliness data to determine a user action in response to receiving the recommendation;

determining the user has improved the environmental condition relative to the environment based on the user action; and discarding cleanliness data collected prior to the user action from consideration for determining one or more subsequent cleanliness trends.

2. The system of claim 1, wherein generating a recommendation for improving the environmental condition relative to the environment based on the identified one or more cleanliness trends further comprises:

identifying the user based on a user profile; and correlating the recommendation with one or more preferences within the user profile.

3. A computer program product comprising a computer-readable storage medium having program instructions embodied therewith, wherein the computer-readable storage medium is not a transitory signal per se, the program instructions executable by a processor to cause the processor to perform a method comprising:

collecting, by a robotic vacuum, cleanliness data relative to an environment;

storing the cleanliness data over a plurality of cleaning cycles;

analyzing the cleanliness data over the plurality of cleaning cycles to identify one or more cleanliness trends;

generating a recommendation for improving an environmental condition relative to the environment based on the identified one or more cleanliness trends;

providing the recommendation to a user;

analyzing, using machine learning, current cleanliness data to determine a user action in response to receiving the recommendation;

determining the user has improved the environmental condition relative to the environment based on the user action; and discarding cleanliness data collected prior to the user action from consideration for determining one or more subsequent cleanliness trends.

4. The computer program product of claim 3, wherein generating a recommendation for improving the environmental condition relative to the environment based on the identified one or more cleanliness trends further comprises:

identifying the user based on a user profile; and correlating the recommendation with one or more preferences within the user profile.

5. The computer program product of claim 3, further comprising:

adjusting a threshold for generating the recommendation based on the user action.

* * * * *